United States Patent
Wieclawski (10) Patent No.: US 7,648,206 B2
(45) Date of Patent: Jan. 19, 2010

(54) VEHICLE SEAT

(75) Inventor: Stanislaw Andrzej Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 12 days.

(21) Appl. No.: 12/113,596

(22) Filed: May 1, 2008

(65) Prior Publication Data

US 2008/0296950 A1 Dec. 4, 2008

(30) Foreign Application Priority Data

May 31, 2007 (DE) .................. 10 2007 025 318

(51) Int. Cl.
*B60N 2/10* (2006.01)
*B60N 2/20* (2006.01)
*B60N 2/235* (2006.01)

(52) U.S. Cl. .................. 297/378.12; 297/378.14; 297/367 R (58) Field of Classification Search ............ 297/378.12, 297/378.14, 367 R
See application file for complete search history.

(56) References Cited

U.S. PATENT DOCUMENTS

| | | | | |
|---|---|---|---|---|
| 3,736,026 | A | * | 5/1973 | Ziegler et al. .......... 297/378.14 |
| 3,972,564 | A | | 8/1976 | Arlauskas et al. |
| 4,088,280 | A | | 5/1978 | Arlauskas |
| 4,103,967 | A | | 8/1978 | Tanaka et al. |
| 4,365,838 | A | | 12/1982 | Berg |
| 4,484,776 | A | | 11/1984 | Gokimoto et al. |
| 4,627,656 | A | | 12/1986 | Gokimoto et al. |
| 4,634,182 | A | * | 1/1987 | Tanaka ................ 297/367 R X |
| 4,836,608 | A | * | 6/1989 | Sugiyama ............ 297/378.12 X |
| 4,919,482 | A | * | 4/1990 | Landis et al. ........ 297/378.14 X |
| 5,052,748 | A | * | 10/1991 | Fourrey et al. ...... 297/378.12 X |
| 5,100,202 | A | * | 3/1992 | Hughes ................ 297/378.11 |
| 5,163,735 | A | | 11/1992 | Aljundi |
| 5,265,937 | A | | 11/1993 | Allen |
| 5,390,980 | A | * | 2/1995 | Premji et al. ........... 297/378.12 |
| 5,476,307 | A | * | 12/1995 | Whalen ................ 297/378.11 |
| 5,718,481 | A | * | 2/1998 | Robinson ............ 297/378.14 X |
| 5,727,768 | A | | 3/1998 | Sakamoto |
| 5,733,008 | A | * | 3/1998 | Tame .................. 297/367 R X |

(Continued)

FOREIGN PATENT DOCUMENTS

DE 10 2005 040 629 A1 3/2007

OTHER PUBLICATIONS

Office Action from the German Patent & Trademark Office dated Apr. 21, 2008, 3 pgs.

*Primary Examiner*—Rodney B White
(74) *Attorney, Agent, or Firm*—Brooks Kushman P.C.

(57) ABSTRACT

A vehicle seat arrangement includes a seat component that is adapted to be slidably attached to a vehicle and configured to move between a sitting position and an entry position. A backrest is pivotally connected to the seat component and pivots about an axis A between a seating position and a tilted entry position. A locking mechanism releasably locks the backrest in the tilted entry position. The locking mechanism has a slotted link that is fixed with respect to the seat component. The slotted link has a locking edge. A locking group moves with the backrest and is configured to contact the locking edge. The locking group has a principal element that pivots relative to the backrest about an axis B. A lock bar is configured to pivot with respect to the principal element about an axis C and to engage the locking edge.

20 Claims, 9 Drawing Sheets

U.S. PATENT DOCUMENTS

| | | |
|---|---|---|
| 5,775,776 A | 7/1998 | Schooler et al. |
| 5,788,330 A * | 8/1998 | Ryan .................... 297/378.12 |
| 5,810,444 A * | 9/1998 | Refior et al. .......... 297/378.12 |
| 5,865,506 A | 2/1999 | Sakamoto |
| 5,938,286 A * | 8/1999 | Jones et al. ......... 297/378.14 X |
| 5,988,751 A | 11/1999 | Yoshida et al. |
| 6,045,188 A | 4/2000 | Schooler |
| 6,045,189 A | 4/2000 | Schooler |
| 6,132,000 A | 10/2000 | Tanaka |
| 6,139,104 A * | 10/2000 | Brewer ............... 297/367 R X |
| 6,139,105 A * | 10/2000 | Morgos et al. ........ 297/378.12 |
| 6,199,953 B1 * | 3/2001 | Chen .................... 297/367 R |
| 6,209,955 B1 * | 4/2001 | Seibold ............. 297/378.12 X |
| 6,464,299 B1 * | 10/2002 | Castagna ........... 297/378.14 X |
| 6,540,232 B2 * | 4/2003 | Hansel et al. ....... 297/378.14 X |
| 6,598,938 B2 * | 7/2003 | Boltze et al. ......... 297/378.12 |
| 6,685,270 B2 * | 2/2004 | Haglund ............. 297/378.12 X |
| 6,722,739 B2 * | 4/2004 | Klein et al. ................. 297/367 |
| 6,736,460 B2 * | 5/2004 | Becker et al. .......... 297/378.12 |
| 6,805,410 B2 * | 10/2004 | Christoffel et al. .. 297/378.14 X |
| 6,869,143 B2 | 3/2005 | Secord |
| 7,017,995 B2 * | 3/2006 | De Nichilo ............ 297/378.14 |
| 7,021,714 B2 | 4/2006 | Oki et al. |
| 7,025,419 B2 | 4/2006 | Sasaki et al. |
| 7,086,698 B2 * | 8/2006 | Shiraki .................... 297/367 R |
| 7,097,252 B2 * | 8/2006 | Becker et al. ....... 297/378.14 X |
| 7,114,779 B2 * | 10/2006 | Thiel et al. .......... 297/378.14 X |
| 7,364,237 B2 * | 4/2008 | Grable et al. ........ 297/378.12 X |
| 7,571,962 B2 * | 8/2009 | Thiel et al. ............... 297/367 R |
| 7,575,281 B2 * | 8/2009 | Jeong .................... 297/367 R |
| 2001/0040400 A1 | 11/2001 | Kamida et al. |
| 2002/0180251 A1 * | 12/2002 | Pospeshil et al. ....... 297/378.14 |
| 2004/0036339 A1 * | 2/2004 | Christoffel et al. .. 297/378.14 X |
| 2004/0104590 A1 | 6/2004 | Kikuchi et al. |
| 2004/0195889 A1 | 10/2004 | Secord |
| 2004/0217638 A1 * | 11/2004 | Shao ..................... 297/378.14 |
| 2005/0248197 A1 * | 11/2005 | Hofmann et al. ............ 297/367 |
| 2006/0006720 A1 * | 1/2006 | Yamada ............... 297/378.14 X |
| 2006/0055223 A1 * | 3/2006 | Thiel et al. .......... 297/378.14 X |
| 2006/0170270 A1 | 8/2006 | Inoue et al. |
| 2009/0108658 A1 * | 4/2009 | Muller et al. ....... 297/378.14 X |

* cited by examiner

VEHICLE SEAT

CROSS-REFERENCE TO RELATED APPLICATIONS

This application claims priority to German Application No. 10 2007 025 318.6, filed on May 31, 2007, the disclosure of which is hereby incorporated in its entirety.

BACKGROUND OF THE INVENTION

1. Field of the Invention

The present invention relates to a vehicle seat assembly capable of performing an easy entry function.

2. Background Art

Some conventional vehicle seats can move forward and/or tilt forward to facilitate ingress to a rear portion of the vehicle. In some vehicle seats, the seat cannot be locked in the entry position. Furthermore, the mechanisms for controlling movement of vehicle seats to an easy position can be relatively complicated and uncomfortable for the user because the user cannot tell when the lock is released and the seat is movable. The present invention addresses these and other problems.

SUMMARY OF THE INVENTION

A vehicle seat arrangement is disclosed herein. In at least one embodiment, the vehicle seat arrangement includes a seat component that is adapted to be slidably attached to a vehicle and configured to move between a sitting position and an entry position. A backrest is connected to the seat component and configured to pivot with respect to the seat component about an axis A between a seating position and a tilted entry position. A locking mechanism is connected to the seat component and to the backrest. The locking mechanism is configured to releasably lock the backrest in the tilted entry position. The locking mechanism has a slotted link that remains fixed with respect to the seat component as the backrest pivots. The slotted link has a locking edge. The locking mechanism further has a locking group that moves together with the backrest. The locking group is configured such that it can contact the locking edge. The locking group has a principal element that is configured to pivot relative to the backrest about an axis B. The locking group further has a lock bar configured to pivot with respect to the principal element about an axis C. The lock bar is configured to engage the locking edge.

BRIEF DESCRIPTION OF THE DRAWINGS

The description herein makes reference to the accompanying drawing wherein like reference numerals refer to like parts through the several views, and in which.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

In one, non-limiting embodiment, the invention provides that a lock bar is attached in a pivotal manner to a principal element of a locking group wherein the principal element is mounted pivotably on a backrest. The lock bar is thereby connected through two pivot linkages with the backrest. Embodiments of the vehicle seat according to the invention are not complicated to produce are relatively easy to operate and permits the vehicle seat to be secured in an entry position. The pivoting connection of the lock bar on the principal element of the locking group permits stretching or folding together of the locking group upon release of the lock, depending on the type of connection made. This stretching or folding together of the locking group in turn brings the locking group into a position in which it can be released very easily from the locking edge. Lower frictional forces are encountered here than with conventional locking systems. Operation of the vehicle seat is further simplified in this manner. Moreover, the principal element and the lock bar form a knuckle joint by means of which an especially large retaining force can be produced for locking despite being easy to release.

In some embodiments, when locked in the entry position, the seat can be released by moving the principal element of the locking group, wherein a motion of the principal element leads to the release of the lock bar from the locking edge. Because the principal element is enlisted as the starting point for the release motion, an improved lever effect can be achieved compared with embodiments where the lock bar is taken as the starting point of the release motion.

In order to be able to move the principal element, compared with embodiments where an actuating element may be provided on the vehicle seat. The actuating element could be designed so that the user experiences tactile feedback through it when the seat lock is released, so that the user can now move the seat back into its seating position. The actuating element could include a switch and an electric motor by means of which the actuating element would be moved. In another embodiment, the actuation element could include a Bowden cable as well as a control located on one of the positions that is readily accessible to the user. Tactile feedback for the user could occur through the Bowden cable.

If such a Bowden cable is provided to move the principal element, the point of application of the Bowden cable on the principal element could be arranged so that when tension is applied to the Bowden cable the principal element moves so that the pivot axis of the lock bar is removed from the slotted link. By removing the pivot axis of the lock bar from the slotted link, the frictional forces between the lock bar and the slotted link are further diminished.

The principal element of the locking group may be mounted and arranged so that activation of the actuating element, e.g., due to pulling insufficiently on the Bowden cable, can give rise to a gravitationally induced position in which the lock bar engages with the locking edge of the slotted link. In such an embodiment, the locking group moves itself into the locked position when the seat is in a position suitable for locking.

The lock bar may be pretensioned with respect to the principal element of the locking group. In this manner the lock bar assumes a preferred position in which the entire locking group is especially easy to move. In particular, the lock bar could be pretensioned with respect to the principal element oriented by the slotted link. In such embodiments, a stop may be present for limiting the motion of the lock bar relative to the principal element. Such a lock could assure a particularly secure locking procedure and, in connection with a pretensioning, could prevent chattering between the lock bar and the principal element of the locking group.

The slotted link can be mounted so that it remains fixed with respect to the seat component when the backrest is tilted into the entry position. In this manner the locking group can move along the slotted link until it reaches the locked position. The fixed mounting of the slotted link with respect to the seat component thus enables a solid and secure locking process.

In some embodiments, at least one region of the slotted link corresponds to a circular section with the pivot axis of the backrest as the mid-point. In this manner, the locking group can be guided especially closely along the slotted link so that no particularly large motions are required for locking.

In other embodiments, at least one of the corners bounding the locking edge of the slotted link is rounded. A concave rounded corner can facilitate the locking process by enabling a larger contact area between the lock bar and the locking edge. A convex rounded corner may simplify the release of the lock.

The end of the lock bar facing the slotted link could likewise be rounded in order to facilitate the locking process, prevent jamming, and reducing frictional forces.

In another embodiment of the invention, a radius of curvature of a convex rounded section of the lock bar is substantially the same size or larger than the radius of curvature of a concave rounded corner of the slotted link. This assures that the lock bar comes into contact at a maximum of two points on the slotted link, which is responsible for the frictional forces being small when the lock is released. In other embodiments of the vehicle seat the principal element of the locking group can be movable in a plane that lies alongside the slotted link. In this manner, twisting of the principal element on the slotted link and a resulting immobilization of the vehicle seat is prevented. In some variations, the principal element moves in a plane that lies adjacent to a plane defined by the slotted link.

In some embodiments, the lock bar moves in a plane in which the locking edge of the slotted link is also located, so that the lock bar is engaged with the locking edge and can move along the locking edge when released. In some embodiments, the pivot axes of the backrest and the lock bar are parallel to one another. In such an arrangement, the tilting motion of the backrest can be coupled with the locking or release motion of the lock bar.

In some embodiments, the pivot axis of the principal element is parallel to the pivot axis of the backrest and/or to the pivot axis of the lock bar. In such arrangements, the motions of these elements can be matched to one another when locking or releasing the lock.

The distance between the pivot axis of the principal element and the pivot axis of the backrest may be larger than a distance between the pivot axis of the backrest and an apex of the slotted link. In such configurations, the principal element is able to move freely with respect to the slotted link and—for a suitable actuation—can introduce a release motion of the lock bar.

In some embodiments, the pivot axis of the lock bar lies further from the pivot axis of the backrest than an apex of the slotted link. When tilting the backrest, the entire locking group can move into a position from which locking is possible.

In some embodiments, when in the locked position, the distance between the pivot axis of the backrest and the pivot axis of the lock bar is smaller than the distance between the pivot axis of the backrest and an outer corner of the locking edge. This relationship could be provoked by a suitable pivoting of the principal element of the locking group. Such a relationship assures that the locking group will not be unintentionally released from its locked configuration.

In the locked position, a contact point between the lock bar and locking edge, the pivot axis of the lock bar, and the pivot axis of the principal element could generate a triangle in a plane perpendicular to the pivot axes. This triangle could facilitate a force distribution that would enable a particularly rigid and secure locking process.

In at least one embodiment a surface of the lock bar and/or the locking edge is provided with a friction-reducing coating in order to further lower the frictional forces between these elements and to make the operation of the vehicle seat arrangement particularly simple to carry out.

The vehicle seat according to the invention could furthermore be designed so that it is pivotable from the seating position through a stable entry position in order to enable a motion of the locking group about this "overtilted" position that gives rise to locking of the seat when the backrest is tilted backwards when the lock bar engages with the locking edge as the backrest is pivoted.

In order to further improve the manipulation of the locking mechanism of the vehicle seat, a control link can be provided that controls the principal element of the locking group. This optional control link can be built into the vehicle seat when it is arranged in parallel to the slotted link used for locking.

In some embodiments, the control link has a holding section and a ramp section. In this way it can fulfill several functions. The holding section can be used to hold the principal element of the locking group at a specific distance from the slotted link used for locking. The ramp section can in turn serve to separate the principal element of the locking group during its motion from the slotted link used for locking. Both the holding section as well as the ramp section can have convex shapes. The possibility of tactile feedback for the operator of the vehicle seat is present since the holding section and the ramp section transition into one another at a corner or edge.

The motion of the principal element need not absolutely be controlled by it, since the retaining element itself slides along the control link. Rather a projection with a small radius of curvature that reduces friction could also be provided, which is designed to slide along the control link.

The control link could either be designed as a rigid or flexible element. In order to prevent blocking of the locking mechanism, the control link may possess a certain amount of flexibility. It may be designed a leaf spring for example. Despite its flexibility, the control link should still always have the ability to apply a sufficiently large force to the principal element of the locking group.

Figure 1:
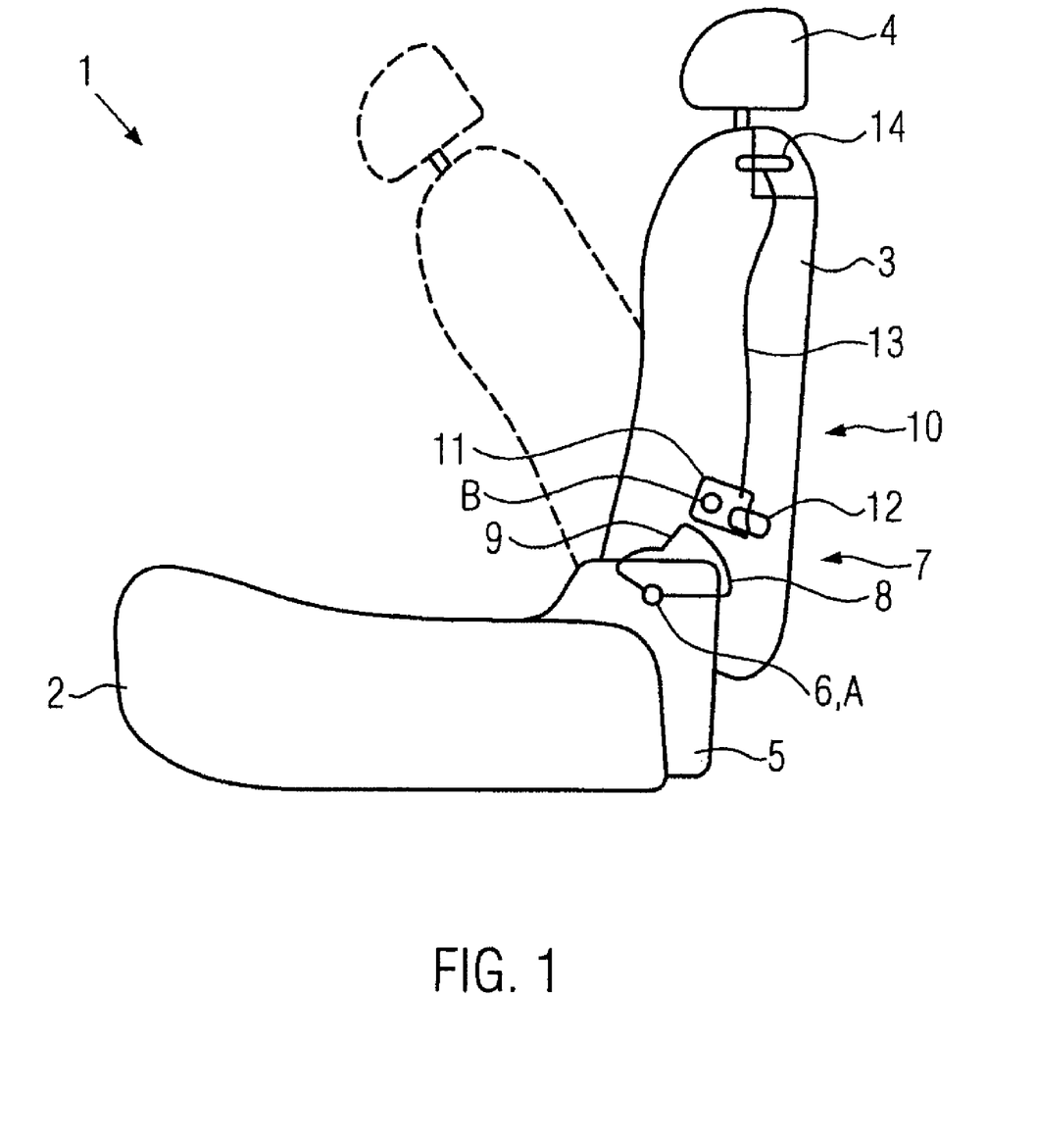
FIG. 1 is a side view of a first embodiment of a vehicle seat assembly according to the invention.

FIG. 1 shows an embodiment of a vehicle seat 1 according to the invention. The seat comprises a seat component 2 and a backrest 3, onto which a headrest 4 is attached. Pivot bearings 6 are respectively provided on two lateral mounting flanges 5. They define a horizontal pivot axis A about which backrest 3 can be pivoted relative to seat component 2. In particular, backrest 3 can be pivoted from a seating position shown by solid lines in which backrest 3 stands upright and an entry position tilted forward and shown by phantom lines. In the entry position access to a rear seat is facilitated.

Vehicle seat 1 is rigidly latched in the seating position. This latching can be released in order to move backrest 3 into the entry position. Backrest 3 can be temporarily locked in the entry position. This facilitates the entry or exiting of the vehicle passengers.

A general locking mechanism designated as 7 is provided for temporarily locking vehicle seat 1 in the entry position. This locking mechanism 7 comprises a locking slotted link 8 that does not participate in the pivoting motion of backrest 3. For example, slotted link 8 could be mounted rigidly on mounting flange 5 opposite seat component 2. Slotted link 8 has a locking edge 9.

Figure 2:
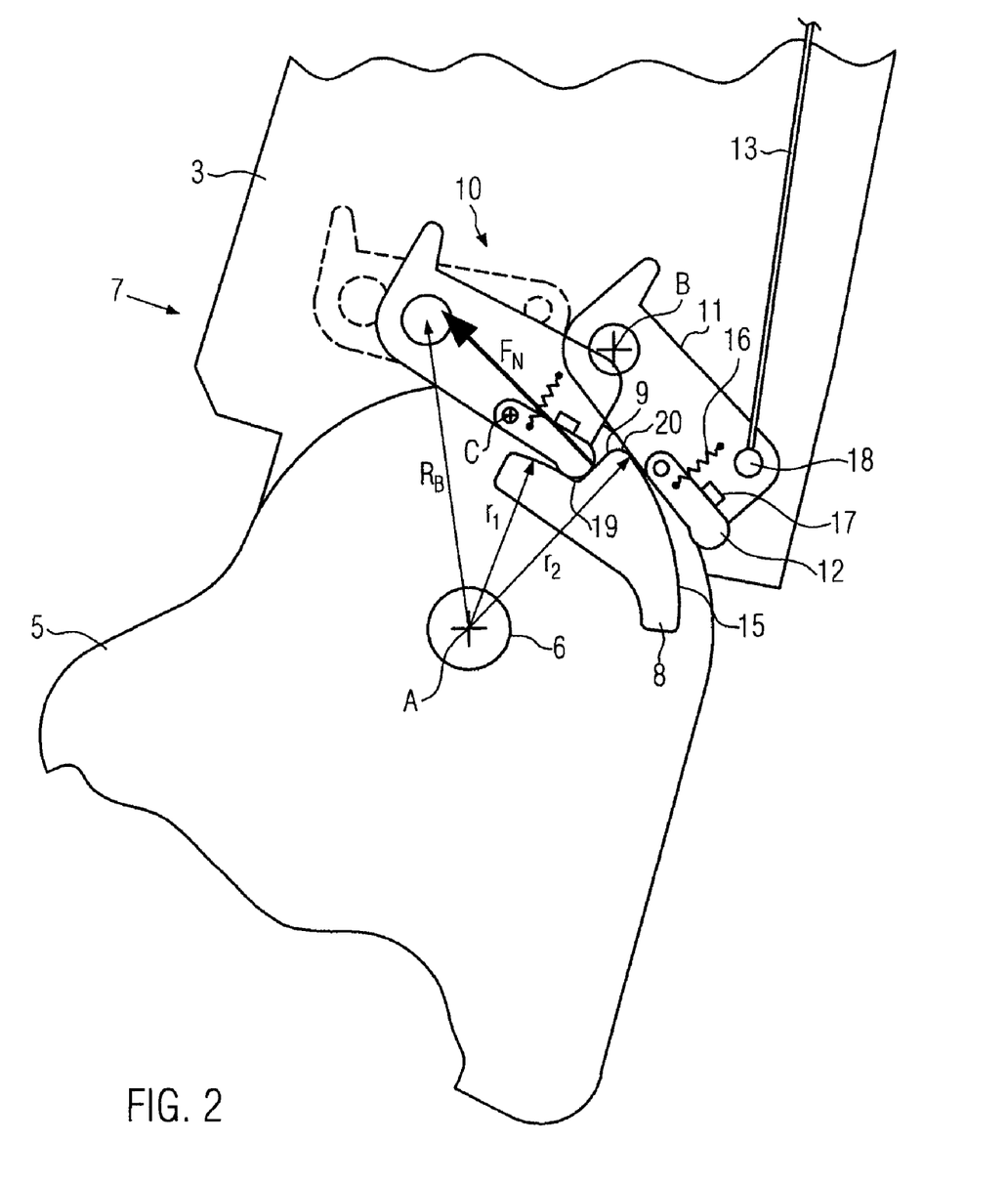
FIG. 2 is a schematic view of a locking mechanism for use with the vehicle seat assembly shown in FIG. 1 in a both released position and in a locked position.

Locking mechanism 7 also comprises a locking group 10 that moves together with backrest 3. Locking group 10 comprises a principal element 11, which is pivotably attached to backrest 3 through a pivot axis B. Locking group 10 also includes a lock bar 12, which is pivotably attached to principal element 11 through another pivot axis C (see FIG. 2). Principal element 11 and lock bar 12 form a knuckle joint by its connection through pivot axis C. A Bowden cable 13 passing through backrest 3 is provided as the actuating element for locking mechanism 7. Bowden cable 13 attaches to principal element 11 of locking group 10, and is operated by a control 14 on the upper end of backrest 3. In particular, control 14 can be pulled upwards in order to cause a pivoting of principal element 11 about pivot axis B through Bowden cable 13. An electrical actuation of the locking mechanism could also be considered as an alternative to a Bowden cable. On the other hand, if actuation by a Bowden cable is preferred, control 14 could also be located on different parts of backrest 3. FIG. 2 shows a schematic view of locking mechanism 7. Slotted link 8 has a section over which its outer edge lies at a constant distance r1 from pivot axis A of backrest 3. On locking edge 9, the distance of the outer surface of slotted link 8 from pivot axis A increases to r2, which slotted link 8 assumes at its apex. Locking edge 9 is bounded at a lower end by a concave inner corner 19 and at an upper end by a convex outer corner 20, which are both depicted as being rounded. On the other side of outer corner 20, or the apex of the slotted link, the distance from pivot axis A is again limited by outer surface 15 of slotted link.

Principal element 11 of locking group 10 is mounted pivotably on backrest 3 above a pivot link having axis B. Pivot axis B is parallel to pivot axis A of backrest 3. Lock bar 12 is pivotably attached to principal element 11 through a pivot axis C that is likewise parallel to these two pivot axes A and B. A helical spring 16 connects principal element 11 and lock bar 12 and exerts pretension directed away from slotted link 8 on lock bar 12. Specifically, spring 16 pulls lock bar 12 against a stop 17 provided on principal element 11.

Attachment point 18 of Bowden cable 13 on principal element 11 is arranged so that pivot axis C of lock bar 12 moves away from slotted link 8 when an upwardly directed tension force is exerted on Bowden cable 13.

Pivot axis B of principal element 11 has a distance RB from pivot axis A that does not change while pivoting backrest 3 about pivot axis A. If the latching mechanism of backrest 3 is released while in its seating position backrest 3 can be tilted forward about swivel axis A. The distance RB between swivel axis A of backrest 3 and pivot axis B of principal element 11 thereby remains constant. Backrest 3 can be tilted forward (to the left in FIG. 2) until principal element 11 of locking group 10 reaches the position shown by the phantom lines. In this case, backrest 3 is located in the "overtilted" position. If the user now pulls once on Bowden cable 13 (required to unlatch backrest 3) principal element 11 of locking group 10 swivels about pivot axis B as determined in the appropriate circumstance by gravitation or a suitable pre-stressing. This pivoting motion causes pivot axis C of lock bar 12 and entire lock bar 12 to approach until lock bar 12 engages slotted link 8 with the curved section having the radius r1.

Backrest 3 can move to the rear from the overtilted position until an end of lock bar 12 engages with locking edge 9 and prevents further swiveling motion of backrest 3. This locked position of locking mechanism 9 is shown as the middle position of locking group 10 in FIG. 2. In this locked position, lock bar 12 is located in a fixed position between locking edge 9 of slotted link 8 and stop 17. Since the radius of curvature of concave rounded end of lock bar 12 is somewhat larger than the radius of curvature of concave corner 19, contact between slotted link 8 and lock bar 12 exists only at two contact points (or contact lines). FIG. 2 shows the normal force FN that acts on lock bar 12 at the contact point between lock bar 12 and locking edge 9 in the locked position. Normal force FN engages lock bar 12 and urges lock bar 12 to rotate in the counterclockwise direction about pivot axis C. This, in turn, urges lock bar 12 against stop 17. This relationship is possible since in the view shown in FIG. 2 the midpoint of pivot axes B, C and the contact point between lock bar 12 and locking edge 9 are located on the vertices of a triangle when locking group 10 is in its locked position. A very large locking force can be produced due to the knuckle joint formed by lock bar 12 and principal element 11.

Figure 3:
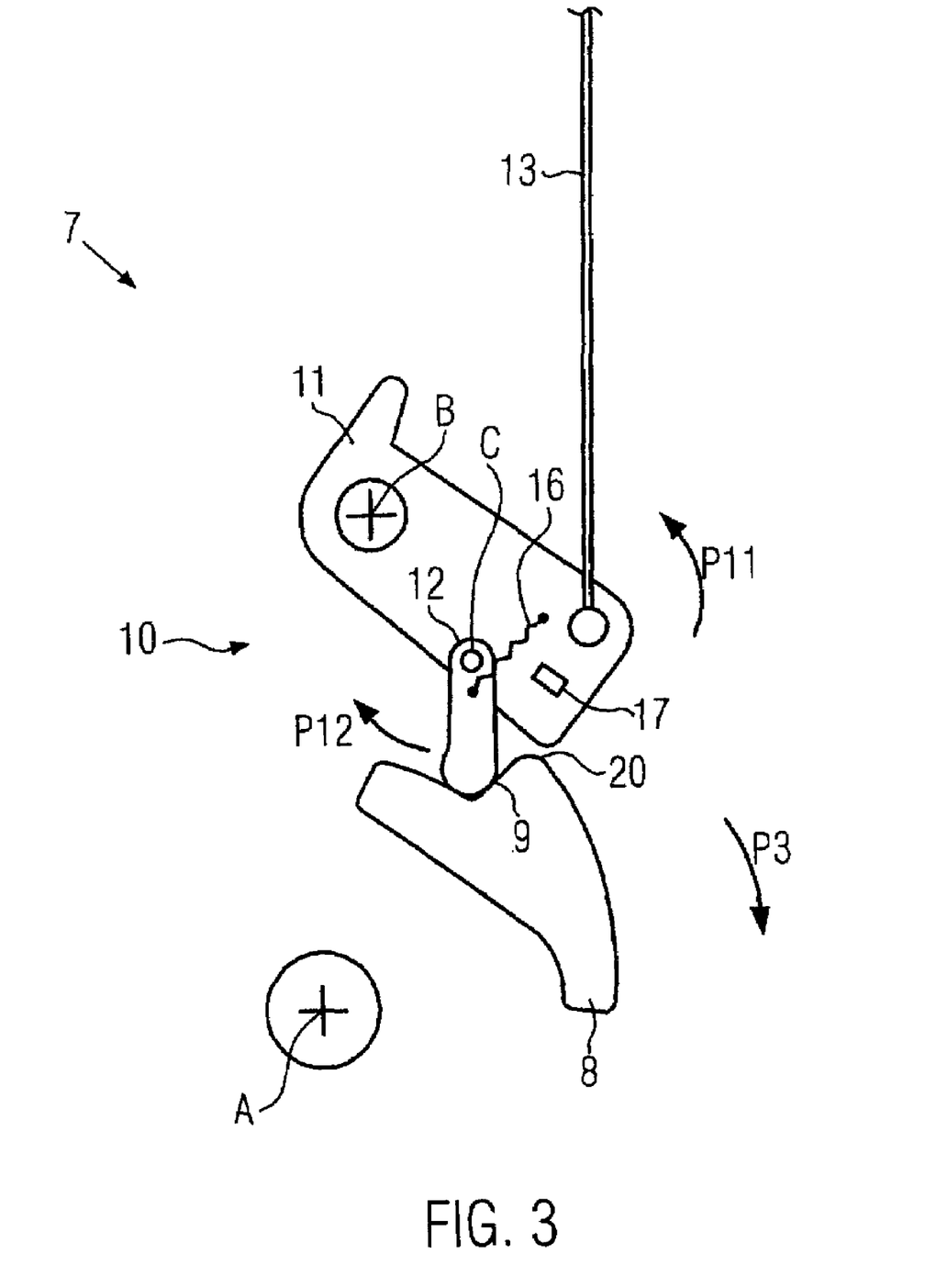
FIG. 3 is a schematic view of the locking mechanism shown in FIG. 2 during the release of the locking mechanism.

FIG. 3 shows locking mechanism 7 when the lock is released. Release of locking mechanism 7 is initiated by the user pulling on Bowden cable 13. This tension causes principal element 11 of locking group 10 to pivot about its pivot axis B. This pivoting of principal element 11 occurs in such a manner that pivot axis C of lock bar 12 lifts away from pivot axis A of backrest 3 and away from slotted link 8. This motion is illustrated by means of the arrow P11.

While principal element 11 pivots in the counterclockwise direction, backrest 3 will have already begun to move back into its seating position under certain circumstances. However, lock bar 12 remains clamped between its pivot axis C and locking edge 9, and can thus not take part in the release motion of principal element 11. However, lock bar 12 can pivot in the direction designated by P12 about its pivot axis C relative to principal element 11. Helical spring 16 is stretched during this pivoting motion of lock bar 12. Because the rounding of the front end of lock bar 12 has a larger radius of curvature than inner corner 19 of slotted link 8, contact is only made between lock bar 12 and slotted link 8 at two discrete points. As a consequence, the frictional forces due to the pivoting of lock bar 12 are very small.

As soon as either principal element 11 has pivoted sufficiently in the upward direction, or lock bar 12 has pivoted sufficiently in the P12 direction relative to principal element 11, lock bar 12 is able to slide over the outer corner, or apex 20, of slotted link 8. From this point on, locking group 10—and with it backrest 3—is free to move about pivot axis A in the pivot direction P3. Backrest 3 can then be brought back into its upright seating position. As soon as lock bar 12 is free of slotted link 8, it pivots due to the pretension exerted by spring 16 until it moves up against stop 17. When the application of tension on Bowden cable 13 is terminated, principal element 11 of locking group 10 continues to pivot due to gravity about pivot axis B, and finally arrives at the position shown on the right in FIG. 2.

Operation of the seat according to the invention is carried out by the user pulling control 14 on Bowden cable 13 in the seating position. This first releases the locking mechanism for backrest 3 and enables a tilting motion of backrest 3. In addition, principal element 11 of locking group 10 is lifted up.

The user tilts backrest 3 into the "overtilted" position (dashed line position of locking group 10 in FIG. 2) and stops applying tension to Bowden cable 13. Locking group 10 pivots about pivot axis B until lock bar 12 engages with slotted link 8. Backrest 3 is pivoted back from the overtilted position into the entry position until lock bar 12 engages with locking edge 9. Locking mechanism 7 is now in its locked position so that backrest 3 of seat 1 is held rigidly and securely in the entry position.

Following the entry or exit of the vehicle passengers, the user again pulls on Bowden cable 13 and thereby causes swiveling of principal element 11 of locking group 10 in the P11 direction. At this point in time the user can begin a backward swiveling of backrest 3 into its upright position. Lock bar 12 pivots about its pivot axis C until it comes free of slotted link 8, and the entire backrest 3 can again be brought into its upright seating position.

Principal element 11 of locking group 10 is not locked directly with slotted link 8. Since only lock bar 12 is directly locked with slotted link 8 in the vehicle seat according to the invention, principal element 11 of locking group 10 can immediately begin with its pivoting motion when a suitable tension is applied through Bowden cable 13. Only small frictional forces oppose the release motion of principal element 11 because lock bar 12 does not slide along locking edge 9 under pressure, but only rotates about its pivot axis C. Furthermore, very large retaining forces can be produced in the locking mechanism by designing the locking group as a knuckle joint. Consequently, the embodiment of vehicle seat 1 described herein enables a stable, secure locking of backrest 3 in its entry position as well as a relatively low effort release action on the part of the user.

Figure 4:
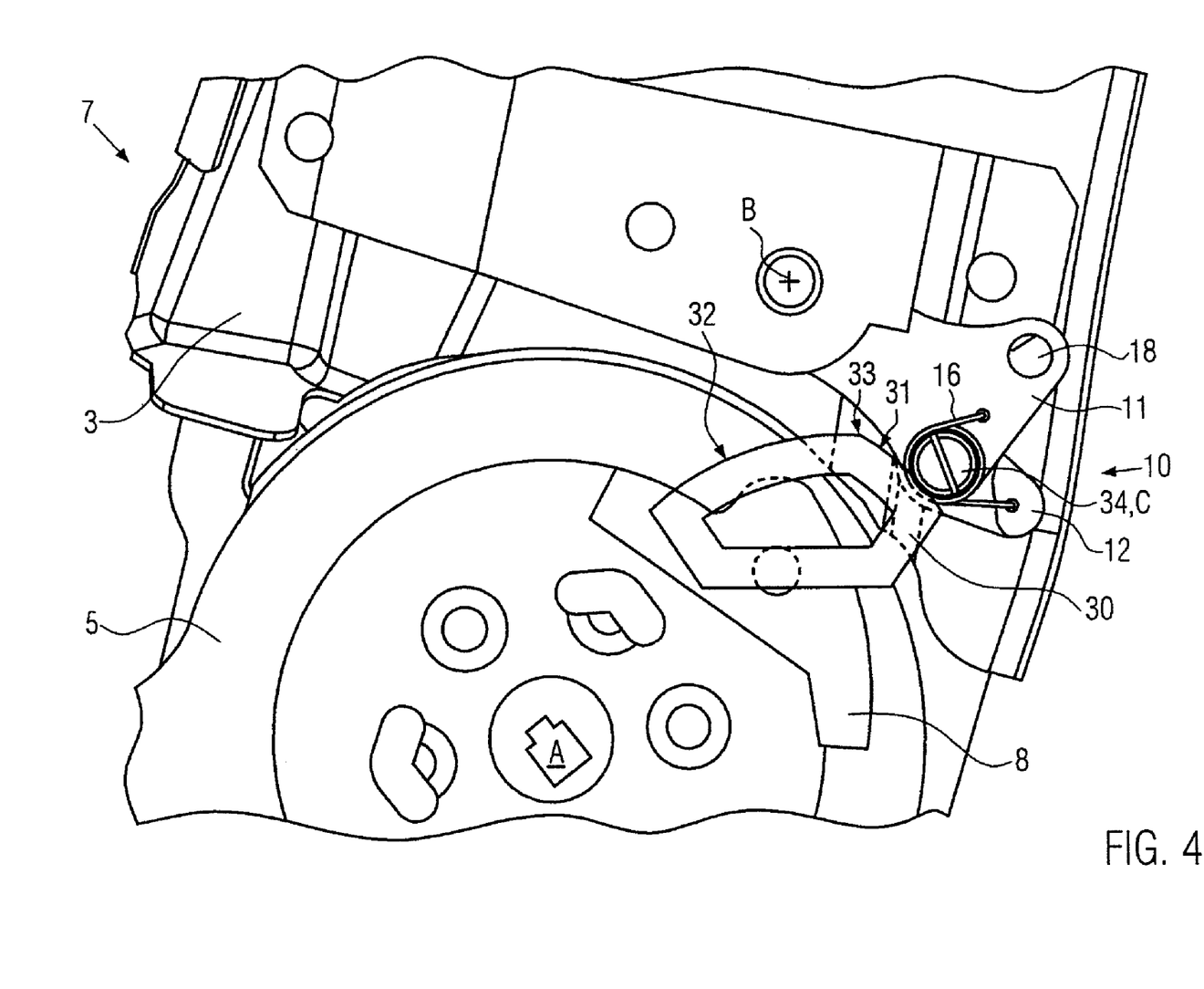
FIG. 4-FIG. 8 are side views of a second embodiment of a vehicle seat assembly according to the invention in different states of motion.

FIG. 4 shows a second embodiment of a locking mechanism 7 for vehicle seat 1 according to the invention. This embodiment differs from the embodiment shown in FIGS. 2 and 3 primarily in that a control link 30 for controlling the motion of principal element 11 of locking group 10 is provided in addition to the locking slotted link. Control link 30 shown here in FIG. 4 is designed as a planar element with 5 sides. It is attached rigidly to mounting flange 5 of seat component 2. It is arranged so that it is located directly alongside locking slotted link 8 but is offset parallel to it on the inner or outer sides of seat 1.

In the embodiment shown here, control link 30 exerts control through a holding section 31 and a ramp section 32, which meet one another at a corner or edge 33. It will become clear from the following description that holding section 31 and ramp section 32 fulfill different functions in controlling the motion of the principal element. Both holding section 31 and ramp section 32 shown here are convex shapes, the radius of curvature of ramp section 32 being smaller than the radius of curvature of holding section 31.

In the embodiment shown in FIG. 4, control link 30 does not interact directly with the planar principal element of locking group 10. Instead, a screw 34 is provided on the principal element that serves not only as a fastener and as the pivot axis C for lock bar 12 on principal element 11, but also as a relatively large head that projects above the plane of principal element 11. This head of screw 34, which is formed as a projection, has a relatively small radius of curvature on its outer side compared to the outer contour of principal element 11. It follows that only comparatively small frictional forces occur when the head of screw 34 slides along control link 30—thereby picking up principal element 11 of locking group 10.

FIGS. 4 to 8 show five partial sections of the sequence of motions of the second embodiment. FIG. 4 shows vehicle seat 1 in its seating position. Backrest 3 of the seat is in its upright and possibly slightly backward tilted position. In this state the head of screw 34 rests on the holding section 31 of the control link. Due to this contact, principal element 11 of locking mechanism 7 is pivoted so far in the counterclockwise direction about its pivot axis B that lock bar 12 can no longer remain in contact with locking slotted link 8. Spring 16 shown here as a helical spring wound about head of screw 34 assures, by means of its pretension, that lock bar 12 is pivoted in the counterclockwise direction about its pivot axis C relative to principal element 11, i.e., in its relaxed position.

Figure 5:
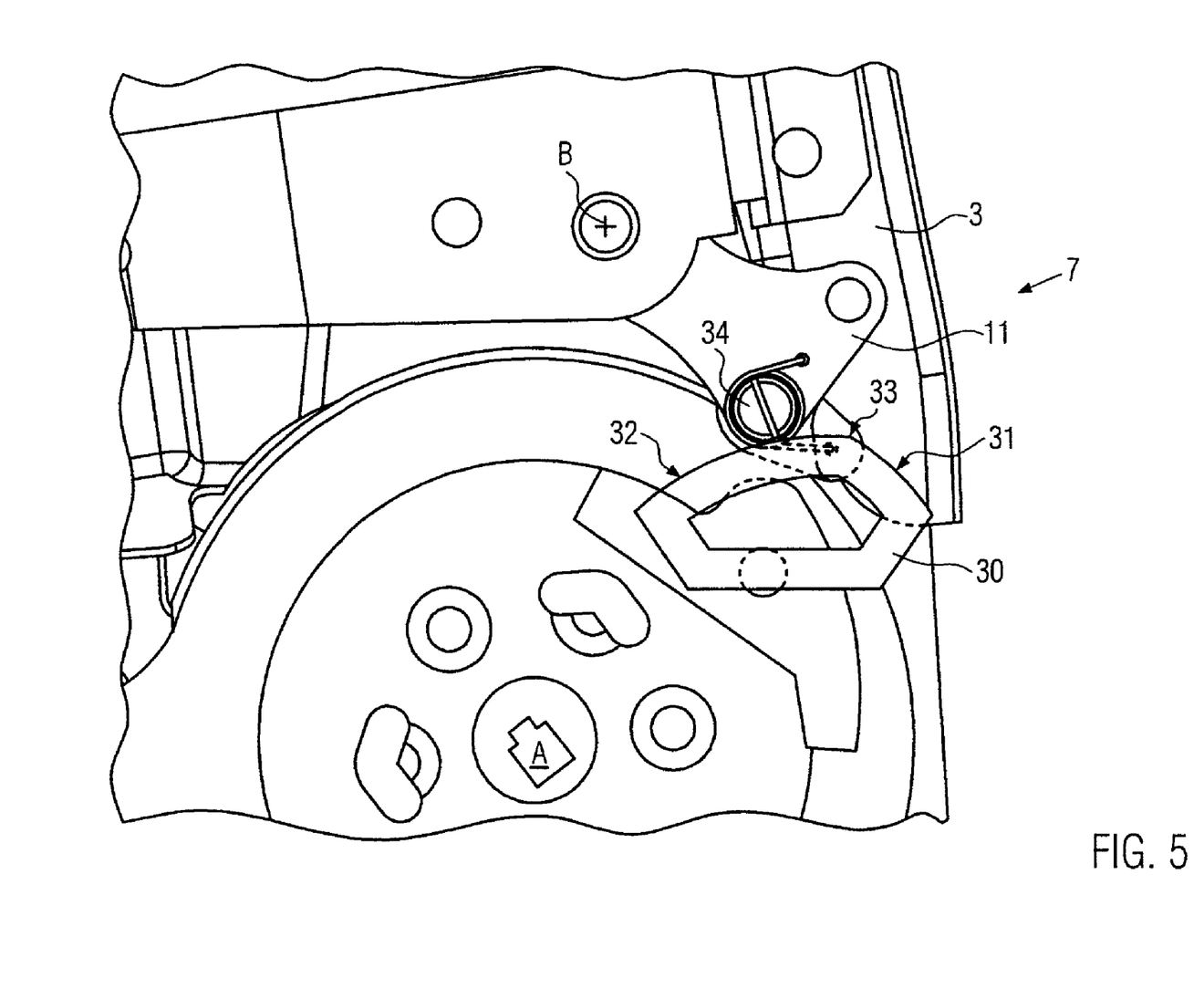

FIG. 5 shows locking mechanism 7 of FIG. 4 in a situation where backrest 3 of vehicle seat 1 has been pivoted in the forward direction through a certain angle about pivot axis A. As already explained with regard to the first embodiment, pivot axis B of locking group 10 moves along an arc about pivot axis A of vehicle seat 1. Due to the weight of principal element 11, and possibly still supported by a pretension pulling principal element 11 downwards, principal element 11 follows the contour of control link 30 by the fact that projection 34 engages control link 30. In FIG. 5, projection 34 of the screw has already been moved over edge 33 between holding section 31 and ramp section 32 of control link 30. While projection 34 was in contact with holding section 31, principal element 11 barely swiveled about its pivot axis B. However, as soon as projection 34 leaves edge 33 behind it, projection 34 can approach pivot axis A of seat 1. Due to its weight or pretension, principal element 11 now pivots about its pivot axis B—clockwise in FIG. 5. During the motion defined by control link 30, the convex shaped head of screw 34 is in contact with convex holding section 31 or convex ramp section 32. Frictional forces are small because the contact between them is restricted to a single point.

Figure 6:
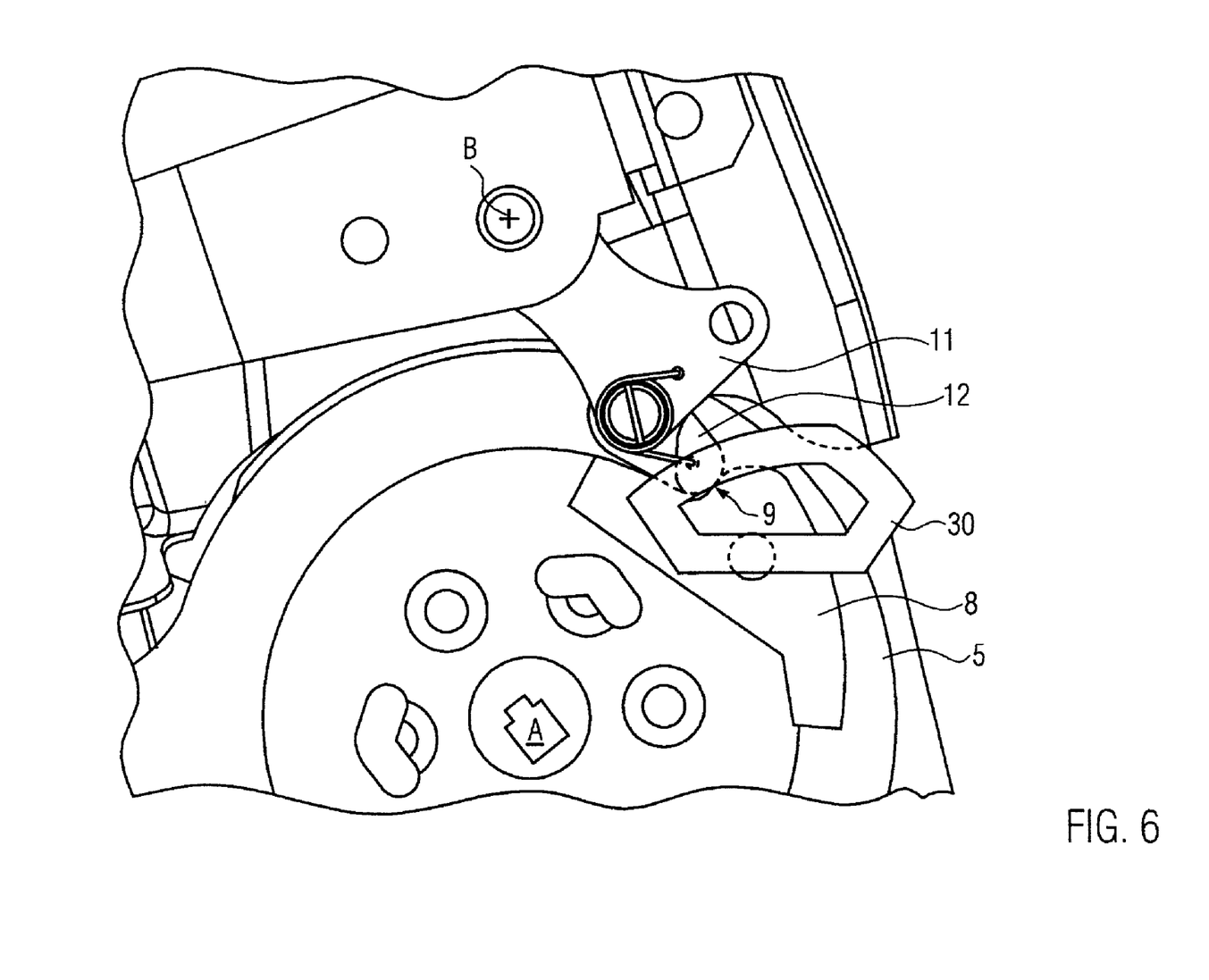

FIG. 6 shows locking mechanism 7 of the second embodiment in the locked position. As was already described with the aid of FIGS. 2 and 3, lock bar 12 of the locking group is brought into contact with locking edge 9 of locking slotted link 8. Projection 34 has moved away from ramp section 32 during the further pivoting motion of backrest 3 from FIG. 5 to FIG. 6, due to the spatial position of ramp section 32. At a certain point in time in the motion of backrest 3 the motion of principal element 11 is no longer defined by control link 30. In some embodiments, this point in time is the same as the point in time at which lock bar 12 comes into contact with locking slotted link 8.

Figure 7:
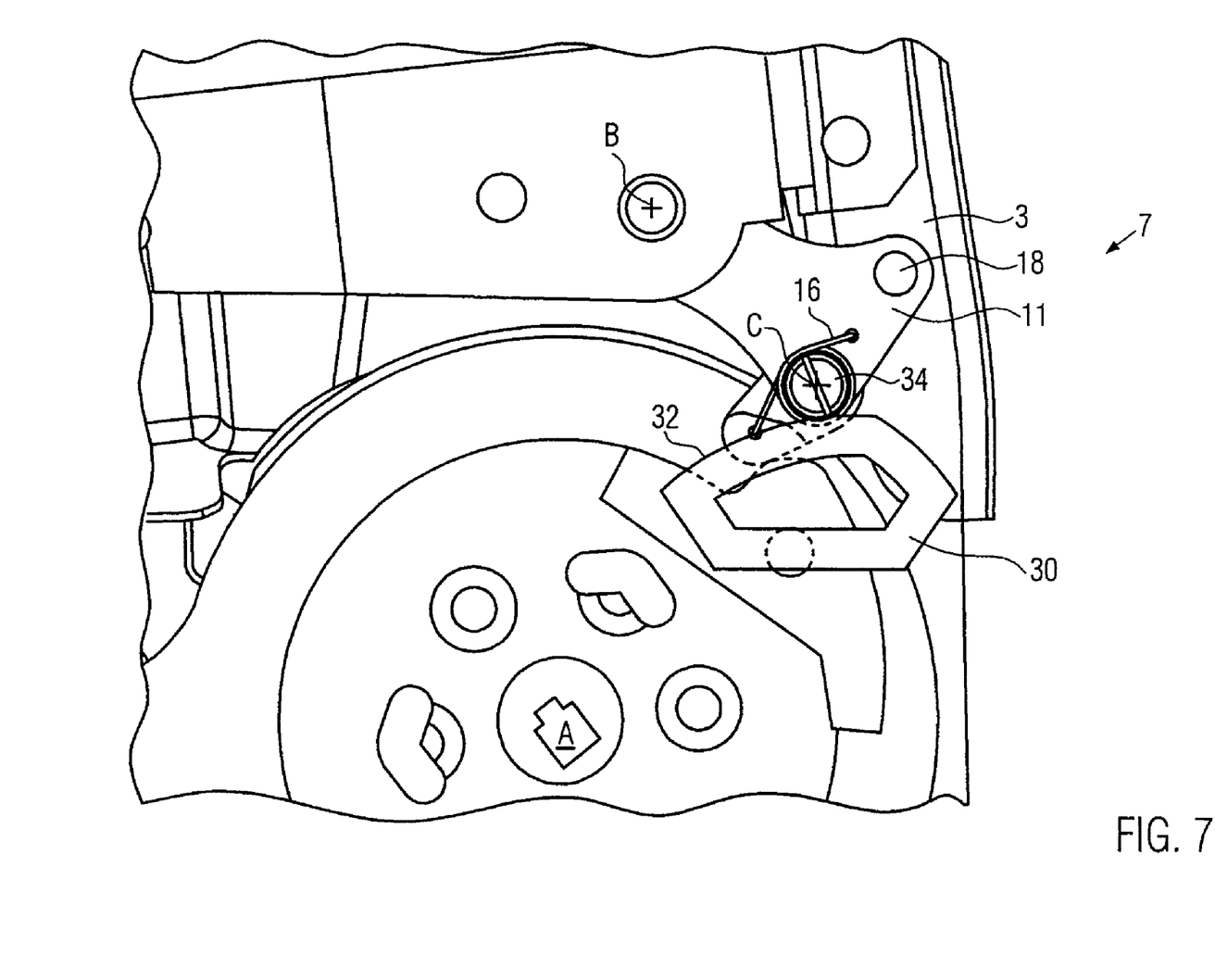

FIG. 7 shows locking mechanism 7 of the second embodiment during its release motion. Starting with FIG. 6, this release motion is initiated by means of Bowden cable 13 (see FIGS. 2, 3) pulling on attachment point 18 and giving rise to a pivoting motion of principal element 11 in a counterclockwise direction about its pivot axis B. Since lock bar 12 is in contact with locking edge 9, it pivots about its pivot axis C so that locking group 10 is stretched. Helical spring 16 expands during this process.

Figure 8:
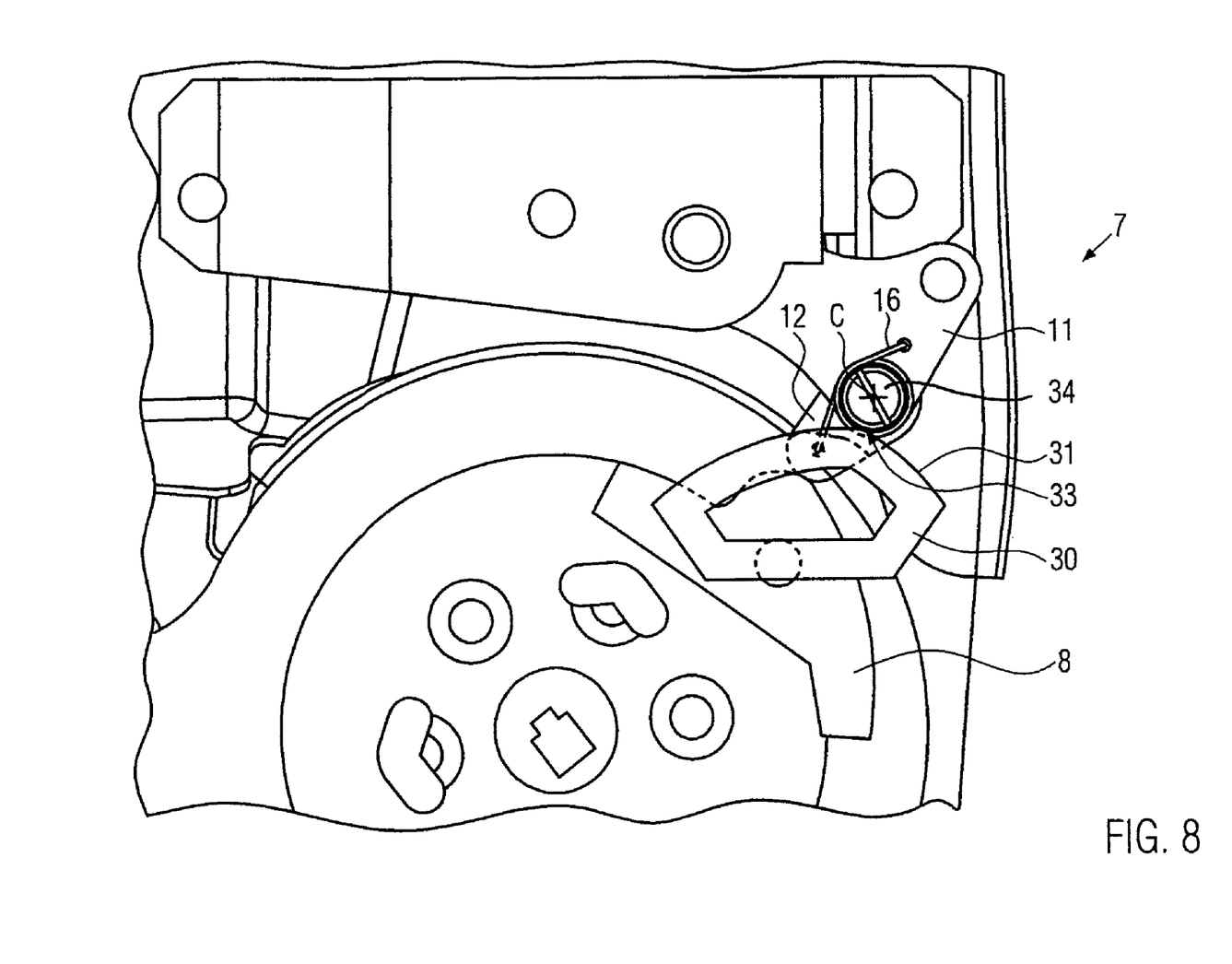

In FIG. 7 backrest 3 is already tilted so far in the backward direction that projection 34 again lies on ramp section 32 of control link 30. If backrest 30 is pivoted further clockwise, projection 34 slides onto ramp section 32 that now acts as a "ramp" until it can reach holding section 31 over edge 33. The situation in which projection 34 is located directly on edge 33 is shown in FIG. 8. The orientation of edge 33 on control link 30 is selected so that lock bar 12 disengages with locking slotted link 8 just as the projection reaches edge 33. At this point the pretension exerted by helical spring 16 urges lock bar 12 to pivot in the counterclockwise direction about its pivot axis C, and thus moves further away from locking slotted link 8. A further pivoting motion of backrest 3 finally assures that locking mechanism 7 and the entire vehicle seat 1 return to the seating position shown in FIG. 4.

Figure 9:
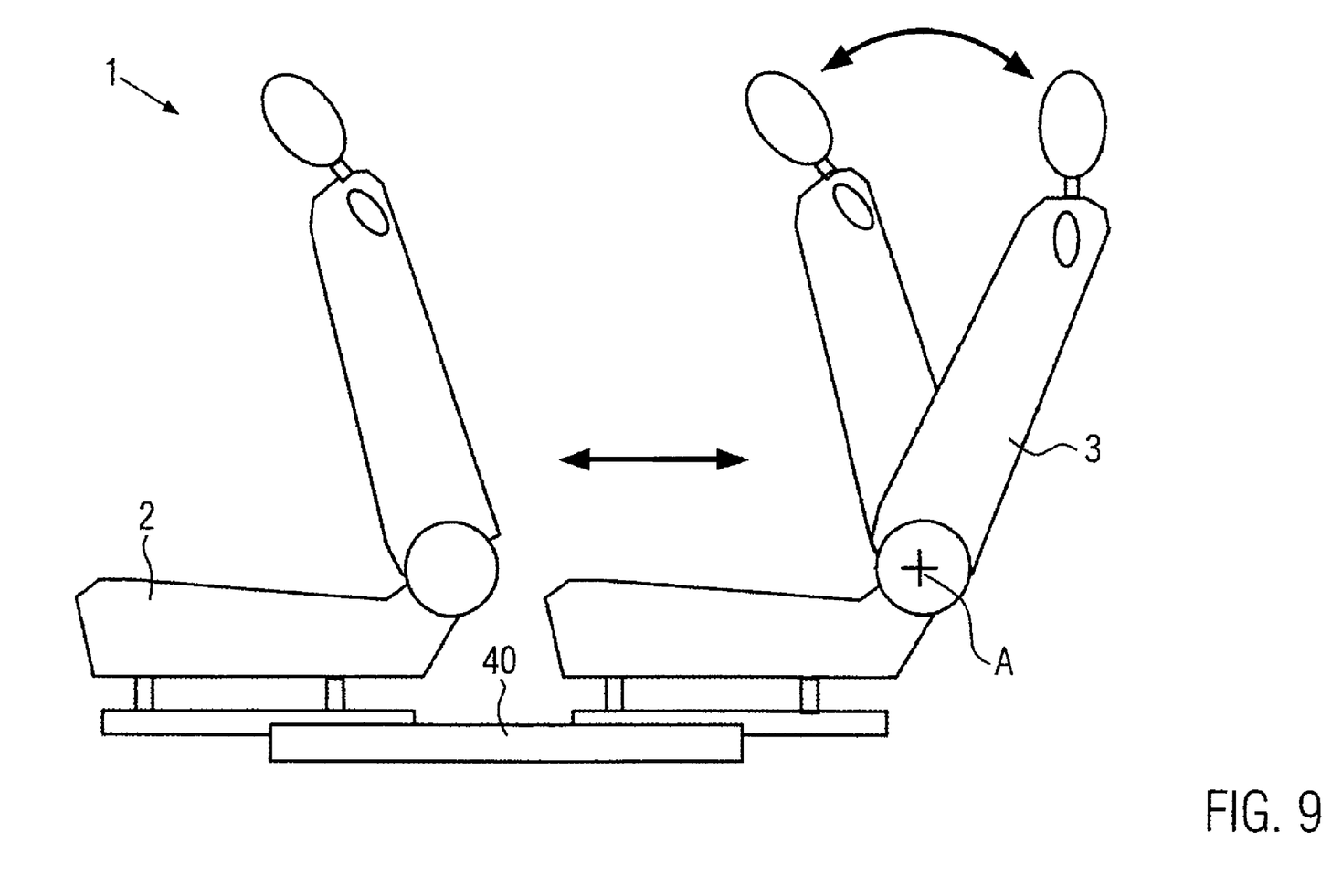
FIG. 9 is a side view of an alternate embodiment of the vehicle seat assembly of the present invention.

FIG. 9 illustrates a possible sequence of motions for another embodiment of vehicle seat 1 according to the invention, which can have a locking mechanism 7 according to one of the embodiments featured above. On the far right, vehicle seat 1 is shown in its seating position in which its backrest 3 is in a seating position that is comfortable for the user, which is generally upright or slightly tilted to the rear. As depicted above, backrest 3 of vehicle seat 1 can be tilted forward from this seating position about its pivot axis A relative to the seat component. Backrest 3 is locked by means of a locking mechanism 7 in its forward-tilted position.

Vehicle seat 1 can be displaced in the forward direction along a rail 40 in the floor of the vehicle after locking backrest 3, or even during the pivoting motion of backrest 3, until it arrives at the entry position shown at the left in FIG. 9 (for clarity vehicle seat 1 in FIG. 9 is shown to be displaced further to the left than would be the case in a real vehicle.)

While vehicle seat 1 is in its entry position, locking mechanism 7 holds backrest 3 in its forward-tilted position. It thereby prevents backrest 3 from pivoting in the backward direction, and assures that the greatest possible amount of space is available for the passenger to enter or exit.

If vehicle seat 1 is again brought into its seating position, the user slides the seat further to the rear along rail 40 until seat component 2 is again located in the starting position shown on the right. In this process a blocking device can be provided to endow seat 1 with a "memory function" so that it remembers its initial seating position. In order to enable the return of seat 1 to its original position, the user must first release a lock between seat 1 and rail 40 if necessary, as well as releasing locking mechanism 7 of backrest 3, before activating a control and pulling Bowden cable 13. Finally, when the seat component is again located in its starting position, the user can tilt backrest 3 back into its seating position as shown on the right.

The vehicle seat according to the invention can be modified in many ways starting from the embodiment shown. For example, it is possible to provide a locking mechanism 7 on one or both sides of backrest 3. The components of locking mechanism 7 shown, and the remaining components of the seat can have a different form. It would be conceivable that principal element 11 of locking group 10 could be pretensioned in the locked position so that it moves immediately into the locked position when the force applied to Bowden cable 13 is terminated. It would also be possible to eliminate the Bowden cable.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat arrangement comprising:
   a seat component adapted to be slidably attached to a vehicle and configured to move between a sitting position and an entry position;
   a backrest connected to the seat component and configured to pivot with respect to the seat component about a first axis between a seating position and a tilted entry position; and
   a locking mechanism connected to the seat component and to the backrest, the locking mechanism configured to releasably lock the backrest in the tilted entry position, the locking mechanism having a link that remains fixed with respect to the seat component as the backrest pivots, the link having a locking edge, the locking mechanism further having a locking group that moves together with the backrest, the locking group being configured such that it can contact the locking edge, the locking group having a principal element that is configured to pivot relative to the backrest about a second axis, the locking group further having a lock bar pivotally disposed on the principal element and configured to pivot with respect to the principal element about a third axis, the lock bar being configured to engage the locking edge.

2. The vehicle seat arrangement of claim 1 wherein the backrest can be released from the tilted entry position by movement of the principal element.

3. The vehicle seat arrangement of claim 2 further comprising an actuating element to move the principal element.

4. The vehicle seat arrangement of claim 3 wherein the actuating element comprises a Bowden cable.

5. The vehicle seat arrangement of claim 4 wherein the Bowden cable is attached to the principal element such that when the Bowden cable is actuated, the principal element moves in a manner that moves the third axis away from the link.

6. The vehicle seat arrangement of claim 1 wherein the backrest can be released from the tilted entry position by movement of the principal element, the vehicle seat arrangement further comprising an actuating element to move the principal element, wherein the principal element is configured to be displaced by gravity such that in the absence of actuation of the actuating element, the principal element moves into a position wherein the lock bar engages the locking edge.

7. The vehicle seat arrangement of claim 1 wherein the principal element is pretensioned in a locked position.

8. A vehicle seat arrangement comprising:
   a seat component adapted to be slidably attached to a vehicle and configured to move between a sitting position and an entry position;
   a backrest connected to the seat component and configured to pivot with respect to the seat component about a first axis between a seating position and a tilted entry position; and
   a locking mechanism connected to the seat component and to the backrest, the locking mechanism configured to releasably lock the backrest in the tilted entry position, the locking mechanism having a link that remains fixed with respect to the seat component as the backrest pivots, the link having a locking edge, the locking mechanism further having a locking group that moves together with the backrest, the locking group being configured such that it can contact the locking edge, the locking group including:
      a principal element that is configured to pivot relative to the backrest about a second axis; and
      a lock bar pretensioned relative to the principal element and configured to pivot with respect to the principal element about a third axis, the lock bar being configured to engage the locking edge.

9. The vehicle seat arrangement of claim 1 further comprising a stop member disposed proximate the seat component when the seat component is disposed in the sitting position.

10. The vehicle seat arrangement of claim 1 wherein a region of the link comprises a circular arc defined along a constant radius from the first axis.

11. The vehicle seat arrangement of claim 10 wherein the locking edge is bounded by two corners and wherein at least one of the two corners is rounded.

12. The vehicle seat arrangement of claim 1 wherein a portion of the lock bar proximate the link is rounded.

13. The vehicle seat arrangement of claim 1 wherein the locking edge is bounded by two corners, wherein at least one of the two corners is rounded and concave, wherein a portion of the lock bar proximate the link is rounded and convex, and wherein a radius of curvature of the convex rounded portion of the lock bar is not less than a radius of curvature of the concave rounded corner.

14. The vehicle seat arrangement of claim 1 wherein the lock bar is coplanar with the locking edge and wherein the lock bar pivots within a plane of the locking edge.

15. The vehicle seat arrangement of claim 1 wherein the first and third axes are substantially parallel with one another.

16. The vehicle seat arrangement of claim 15 wherein the first, second, and third axes are substantially parallel with one another.

17. The vehicle seat arrangement of claim 1 wherein a distance between the first and second axes exceeds a distance between the first axis and an apex of the link.

18. The vehicle seat arrangement of claim 17 wherein the third axis lies at a greater distance from the first axis than the apex when the backrest is in the seating position.

19. The vehicle seat arrangement of claim 1 wherein the distance between the first and third axes is less than a distance between the first axis and an outer corner of the locking edge when the backrest is in the tilted entry position.

20. The vehicle seat arrangement of claim 1 further comprising a control link supported on the link, the control link being configured to control the motion of the principal element.

* * * * *